United States Patent Office

3,268,416
Patented August 23, 1966

3,268,416
PROCESS FOR THE PREPARATION OF 3′-PHOSPHOADENOSINE - 5′ - PHOSPHOSULFATE AND ADENOSINE - 5′ - PHOSPHOSULFATE
Seizi Igarasi, Ashiya, Yuichi Takeuchi, Akashi, Akira Imada, Nishinomiya, and Ikuo Nogami, Suita, Japan, assignors to Takeda Chemical Industries, Ltd., Osaka, Japan
No Drawing. Filed July 6, 1964, Ser. No. 380,633
10 Claims. (Cl. 195—28)

This invention relates to a method for the industrial production of 3′-phosphoadenosine-5′-phosphosulfate and adenosine-5′-phosphosulfate by the use of certain microorganisms.

Both 3′-phosphoadenosine-5′-phosphosulfate (hereinafter referred to as "PAPS") and adenosine-5′-phosphosulfate (hereinafter referred to as "APS") are known to be intermediates of sulfate metabolism, occuring in the course of the assimilation of inorganic sulfate in the living body as sulfur-containing organic compounds, for example choline sulfate, arylamine sulfate, steroid sulfate such as androsterone sulfate, progesterone sulfate and estrone sulfate, mucopolysaccharide sulfate such as chondroitin sulfate, and especially to be useful as biologically active sulfate donor for detoxication of aromatic compounds, for example, indoxyl, skatole, benzene and phenols such as phenol and cresol. Therefore, PAPS and APS have valuable therapeutic properties, especially as antidotes for toxic compounds of the recited type.

The production of PAPS and/or APS by purified enzymatic preparation or chemical means has been known. In the known enzymatic method expensive adenosine-triphosphate (ATP) must be employed as the starting material. In known chemical methods also expensive starting materials must be employed, and these methods are inevitably accompanied by undesirable by-products which are difficultly separated, if at all, from the objective compounds. To make the matter worse, the yields realized by these known methods are so poor that they can be determined qualitatively only by the chromatographic method. Therefore, hitherto known methods, whether they are chemical or enzymatic, can hardly be regarded as profitable; they certainly are not of industrial feasibility.

By the present invention, it is discovered that Streptomyces microorganisms are capable of producing and accumulating PAPS and APS in their culture broth to a commercially profitable extent, the PAPS and APS being recoverable from the culture broth in satisfactory yields. It has never been known that microorganisms, not to speak of those belonging to the genus Streptomyces, are capable of accumulating PAPS and APS in their culture broth.

The present invention thus concerns a process for preparing PAPS and/or APS on an industrial scale, which comprises inoculating Streptomyces microorganisms into an aqueous nutrient-containing medium, incubating the so-inoculated medium, and recovering PAPS and APS accumulated in the culture broth.

The object of the present invention is to provide methods for achieving the accumulation of PAPS and/or APS in culture broth in such form and quantity that they may be recovered therefrom on a scale suitable for industrial production.

Another object of the present invention is to provide PAPS and APS in sufficient quantity to render feasible their use for medical treatments.

The Streptomyces microorganisms employable in the present invention are, for example, *Streptomyces phaeochromogenes, Streptomyces, griseus, Streptomyces hygroscopicus, Streptomyces, aureus, Streptomyces vinaceus, Streptomyces griseoflavus, Streptomyces parvus, Streptomyces californicus, Streptomyces scabies, Streptomyces virginiae.*

The culture medium employed in the present invention may be solid or liquid, but a liquid medium is more suitable. The incubation of the Streptomyces microorganisms in a liquid medium may be stationary or submerged with or without agitation and aeration.

The culture medium may be a synthetic one containing such nutrients as required for the growth of Streptomyces microorganisms comprising assimilable carbon, nitrogen, phosphate and sulfate sources employed in usual cultivation of these microorganisms.

Carbon sources comprise, for example, starch, dextrin, glucose, sucrose, lactose, maltose and glycerol; and the nitrogen sources include the organic or inorganic nitrogen-containing-compounds, for example, peptone, yeast extract, yeast, soy bean meal, cornsteep liquor, amino acids, ammonium salts and nitrates. Further, salts of metals such as magnesium, calcium, potassium, sodium, copper, iron, manganese, cobalt, and inorganic salts such as chloride may be added to the medium. If desired or necessary, vitamins, trace elements or suitable precursors such as adenine, adenosine, adenylic acid, hypoxanthine, inosine and inosinic acid may be added as growth accelerator, and animal or vegetable or mineral oil as an antifoaming agent may further be added.

The incubation conditions, as the case may be, are selected so as to obtain the desired PAPS and/or APS in high yield.

The incubation conditions vary with the microorganisms used, the strain used, or the contents of medium but usually the initial pH of the medium is preferably adjusted at around neutral, and a temperature within the range of 20° to 37° C. is employed. As the cultivation proceeds, PAPS and/or APS are produced and accumulated in the culture broth. PAPS and/or APS are accumulated both inside and outside the cells depending on the strain of Streptomyces microorganisms and the incubation conditions. Further, the culture broth often contains, for example, adenosine-5′-monophosphate, adenosine-diphosphate, adenosine-triphosphate, and 3′-phosphoadenosine-5′-phosphate (PAP). The sorts and quantity of accumulated substances above mentioned vary with the strain of Streptomyces microorganisms, incubation conditions, etc.

The incubation is stopped at the time when the maximum yield of the desired compounds is found to be accumulated by tracing the amount continuously during the incubation.

The time required to obtain the maximum concentration of PAPS and APS in the nutrient medium varies with the method of cultivating the microorganisms but, in general, the maximum concentration is obtainable within two to fifteen days, especially three to seven days. For tracing the accumulation of PAPS and APS in the incubation mixture, a known method of qualitative analysis of PAPS and APS can be employed, for example, paper electrophoresis, paper chromatography, separation by ion exchange resins, measurement of the absorption in the ultraviolet spectrum, and enzymatic qualitative analysis.

The accumulated PAPS and APS may be separated individually or mixedly from the culture broth either as the free acid or in a salt form. In order to separate PAPS and APS from the culture broth, the treatment with an ion exchanger such as ion exchange resins, ion exchange celluloses or ion exchange Sephadex (Pharmacia, Sweden) is employed, and a per se known means for separation of nucleotide may be applied separately or in combination or repeatedly, for example, by utilizing difference in solubility, difference in partition coefficient, difference in adsorption, or difference in electrophoretic coefficient between the objective compound or compounds and impurities, by crystallization, or by the addition of a precipitant (precipitation reagent).

Employing ion exchange resin to isolate PAPS and APS from the culture broth, the basic anion exchange resins such as Dowex 1X2, Dowex 1X8, Dowex 3 (Dow Chemical Co., Inc., Midland, Michigan) are suitable. These resins may be prepared by such methods as are described in "Ion Exchange Resin" (Robert Kumin, published by John Wiley & Sons, Inc., New York, N.Y., pages 87–97) or those described in the literature references cited therein.

For the purpose of giving those skilled in the art a better understanding of the invention, the following non-limitative illustrative examples of presently-preferred embodiments are given, and it is to be understood that minor modifications and variations may be resorted to without departing from the spirit and scope of the invention, as those skilled in the art will readily understand. Such modifications and variations are considered to be within the purview and scope of the invention and appended claims. In these examples, percentages are all on the weight basis; the relationship between part by weight and part by volume is the same as that between gram and milliliter.

*Example 1*

Streptomyces phaeochromogenes Waksman and Henrici (ATCC 15486) is inoculated in 1,000,000 volume parts of aqueous culture medium (pH 7.2) containing 1% of glucose, 1% of sodium glutamate, 0.05% of dipotassium hydrogen phosphate and 0.02% of magnesium sulfate, and having been sterilized by autoclaving for fifteen minutes under 15 pounds per square inch. After inoculation, the culture mixture is incubated at a temperature of about 28° C. for seven days with agitation and aeration.

The culture broth is adjusted to pH 4–5 and then filtered. The filtrate is treated with 22 weight parts of activated charcoal, whereupon objective substances are adsorbed on and then eluted from the charcoal with the use of 440 volume parts of ammoniacal aqueous ethanol (EtOH:water:28% aqueous ammonia=50:49:1). The eluate is treated with 120 volume parts of strongly basic anion exchange resin (Dowex 1X8), formic acid form, followed by washing with water and 0.1 molal formic acid. PAP is then eluted with 0.1 molal formic acid-0.4 molal ammonium formate. APS is successively eluted with 0.5 molal formic acid–0.5 molal ammonium formate. PAPS is finally eluted with 0.8 molal formic acid-2 molal ammonium formate. So-obtained respective fractions are freeze-dried to obtain 250 weight parts of PAPS, 50 weight parts of PAP, 100 weight parts of APS, 70 weight parts of adenosine-5'-monophosphate, and 50 weight parts of adenosine-diphosphate.

*Example 2*

Streptomyces griseus Waksman et al. (ATCC 10137) is incubated after the manner described in Example 1 to obtain 100 weight parts of PAPS and 20 weight parts of PAP per 1,000,000 volume parts of the culture mixture.

*Example 3*

Streptomyces hygroscopicus var. angustomyceticus Sakai, Yuntsen et Ishikawa (ATCC 15484) is inoculated in 1,000,000 volume parts of aqueous culture medium (pH 7.0) containing 2% of glycerin, 2% of sodium glutamate, 0.7% of dipotassium hydrogen phosphate, 0.2% of potassium dihydrogen phosphate, 0.2% of magnesium sulfate and 0.1% of ammonium sulfate and having been sterilized by autoclaving for fifteen minutes under 15 pounds per square inch.

After inoculation the culture mixture is incubated at a temperature of 24° C. for seven days with agitation and aeration. The culture broth is treated after the manner described in Example 1 to obtain 195 weight parts of PAPS.

*Example 4*

The microorganisms under-listed are respectively incubated for seven days and treated after the manner described in Example 3 to obtain the following yields of PAPS per 1,000,000 volume parts of the culture mixture:

| Microorganism: | Yield of PAPS (weight parts) |
|---|---|
| Streptomyces aureus Waksman and Henrici (ATCC 3309) | 165 |
| Streptomyces griseolus Waksman and Henrici (NRRL B–1062) | 105 |
| Streptomyces vinaceus Mayer et al. (NRRL B–1381) | 85 |
| Streptomyces griseoflavus Waksman and Henrici (ATCC 12269) | 110 |
| Streptomyces parvus Waksman and Henrici (NRRL B–1255) | 105 |
| Streptomyces californicus Waksman and Henrici (ATCC 3312) | 63 |
| Streptomyces scabies Waksman and Henrici (ATCC 15485) | 130 |
| Streptomyces virginiae Grundy et al. (NRRL B–1446) | 132 |

*Example 5*

Streptomyces virginiae Grundy et al. (NRRL B–1446) is incubated and treated with activated charcoal after the manner described in Example 1.

The ammoniacal aqueous ethanol eluate is treated with 1,800,000 volume parts of diethylaminoethylcellulose, followed by washing with 10,000,000 weight parts of 0.05 molal ammonium hydrogencarbonate (pH 8.6). Adenosine-5'-monophosphate is then eluted with 0.1 molal ammonium hydrogencarbonate. PAPS is eluted with 0.5 molal ammonium hydrogencarbonate. So obtained respective fractions are freeze-dried to obtain 64 weight parts of adenosine-5'-monophosphate and 132 weight parts of PAPS.

Having thus disclosed the invention, what is claimed is:

1. A process for preparing, as objective substance, a member selected from the group consisting of 3'-phosphoadenosine - 5' - phosphosulfate, adenosine - 5' - phosphosulfate and a mixture thereof, which comprises inoculating a microorganism belonging to the genus Streptomyces into an aqueous nutrient-containing medium, incubating the so-inoculated medium, and recovering said objective substance accumulated in the culture broth.

2. A process for preparing, as objective substance, a member selected from the group consisting of 3'-phosphoadenosine - 5' - phosphosulfate, adenosine - 5' - phosphosulfate and a mixture thereof, which comprises inoculating a microorganism belonging to the genus Streptomyces in an aqueous nutrient medium containing sources of assimilable carbon, nitrogen, phosphate and sulfate, incubating the so-inoculated medium, and recovering said objective substance accumulated in the culture broth.

3. A process for preparing, as objective substance, a member selected from the group consisting of 3'-phosphoadenosine - 5' - phosphosulfate, adenosine - 5' - phosphosulfate and a mixture thereof, which comprises inoculating a microorganism belonging to the genus Streptomyces into an aqueous nutrient medium aljusted to a pH in the neighborhood of neutrality and containing sources of assimilable carbon, nitrogen, phosphate and sulfate, incubating the so-inoculated medium at 20 to 37° C., and recovering said objective substance accumulated in the culture broth.

4. A process for preparing, as objective substance, a member selected from the group consisting of 3'-phosphoadenosine - 5' - phosphosulfate, adenosine - 5' - phosphosulfate and a mixture thereof, which comprises inoculating a microorganism belonging to the genus Streptomyces into an aqueous nutrient medium adjusted to a pH in the neighborhood of neutrality and containing sources of assimilable carbon, nitrogen, phosphate and sulfate, incubating the so-inoculated medium at 20 to 37° C. for 2 to 15 days, and recovering said objective substance accumulated in the culture broth.

5. A process for preparing a member selected from the group consisting of 3'-phosphoadenosine-5'-phosphosulfate-adenosine-5'-phosphosulfate and a mixture thereof, which comprises inoculating a microorganism belonging to the genus Streptomyces into an aqueous nutrient medium at a pH of about 7.0 and containing sources of assimilable carbon, nitrogen, phosphate and sulfate, incubating the so-inoculated medium at 20 to 37° C. for 2 to 15 days, filtering the culture broth after acidifying same, treating the filtrate with activated charcoal, removing the adsorbed phosphosulfates from the latter with ammoniacal aqueous ethanol as the eluant, treating the thus-obtained eluate with a basic anion exchange resin, removing the adsorbed phosphosulfates from the latter with aqueous solution of formic acid and ammonium formate as the eluant, and freeze-drying the so-obtained eluate.

6. A process for preparing a member selected from the group consisting of 3'-phosphoadenosine-5'-phosphosulfate, adenosine-5'-phosphosulfate and a mixture thereof, which comprises inoculating a microorganism selected from the group consisting of *Streptomyces phaeochromogenes, Streptomyces griseus, Streptomyces hygroscopicus, Streptomyces aureus, Streptomyces griseolus, Streptomyces vinaceus, Streptomyces griseoflavus, Streptomyces parvus, Streptomyces, californicus, Streptomyces scabies* and *Streptomyces virginiae,* into an aqueous nutrient culture medium adjusted to about neutrality and containing sources of assimilable carbon, nitrogen, phosphate and sulfate, incubating the culture mixture at 20 to 37° C. for 2 to 15 days, filtering the culture broth after acidifying same, treating the filtrate with activated charcoal, removing the adsorbed phosphosulfates from the latter with ammoniacal aqueous ethanol as the eluant, treating the thus-obtained eluate with a basic anion exchange resin, removing the adsorbed phosphosulfates from the latter with aqueous solution of formic acid and ammonium formate as the eluant, and freeze-drying the so-obtained eluate.

7. A process according to claim 5, wherein the said microorganism is *Streptomyces phaeochromogenes.*

8. A process according to claim 5, wherein the said microorganism is *Streptomyces griseus.*

9. A process according to claim 5, wherein the said microorganism is *Streptomyces hygroscopicus.*

10. A process according to claim 5, wherein the said microorganism is *Streptomyces aureus.*

References Cited by the Examiner

Colowick et al., Methods in Enzymology, vol. V, pages 766 to 775 (1962).

A. LOUIS MONACELL, *Primary Examiner.*

ALVIN E. TANENHOLTZ, *Examiner.*